United States Patent [19]

Aiyfuku

[11] Patent Number: 4,716,433
[45] Date of Patent: Dec. 29, 1987

[54] BATTERY CHECKING CIRCUIT

[75] Inventor: Kiyoshi Aiyfuku, Kanagawa, Japan

[73] Assignee: Canon Kabushiki Kaisha, Tokyo, Japan

[21] Appl. No.: 727,587

[22] Filed: Apr. 26, 1985

[30] Foreign Application Priority Data

Apr. 28, 1984 [JP] Japan .................................. 59-86884
Apr. 28, 1984 [JP] Japan .................................. 59-86885
Sep. 10, 1984 [JP] Japan ................................ 59-189054
Mar. 6, 1985 [JP] Japan .................................. 60-44001

[51] Int. Cl.$^4$ .......................................... G03B 17/18
[52] U.S. Cl. .................................... 354/468; 354/424; 354/475
[58] Field of Search ................. 354/21, 410, 412, 465, 354/468, 471, 472, 473, 474, 475, 289.1, 289.12, 173.1, 173.11, 195.1; 340/636; 324/436

[56] References Cited

U.S. PATENT DOCUMENTS 4,525,055  6/1985  Yokoo .................................. 354/468
4,560,937 12/1985  Finger ................................. 340/636

FOREIGN PATENT DOCUMENTS 0046332  3/1983  Japan .................................. 354/468

Primary Examiner—Russell E. Adams
Attorney, Agent, or Firm—Toren, McGeady & Associates

[57] ABSTRACT

A battery checking circuit constructed with a pulse generating circuit for producing a pulse in response to operation of a camera, a counter for counting the pulses produced from the pulse generating circuit, a display divided into a plurality of parts for displaying the remaining amount of electric energy of a battery according to the number of energized display parts, and a display control circuit for controlling the display in accordance with the output of the counter.

38 Claims, 12 Drawing Figures

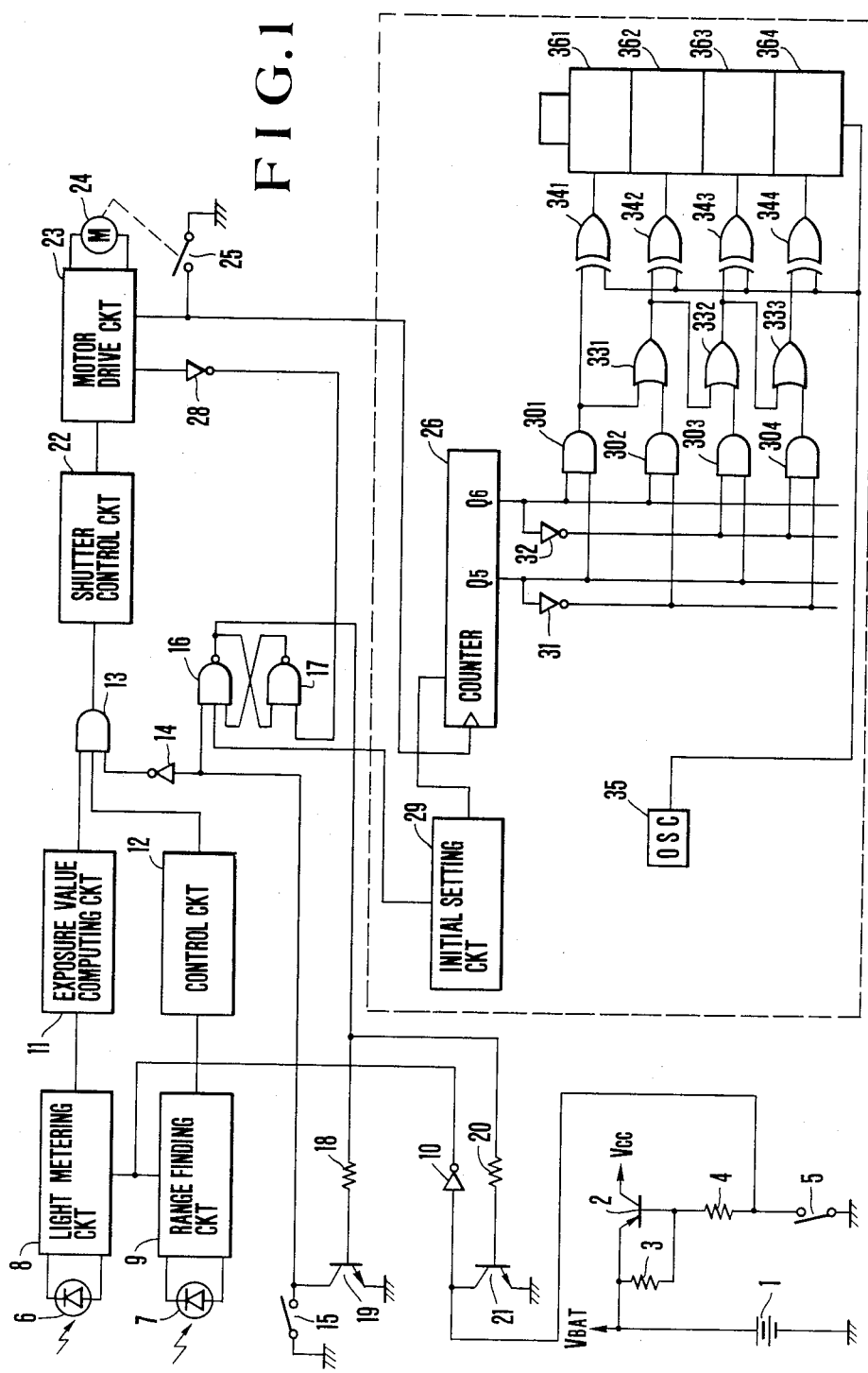

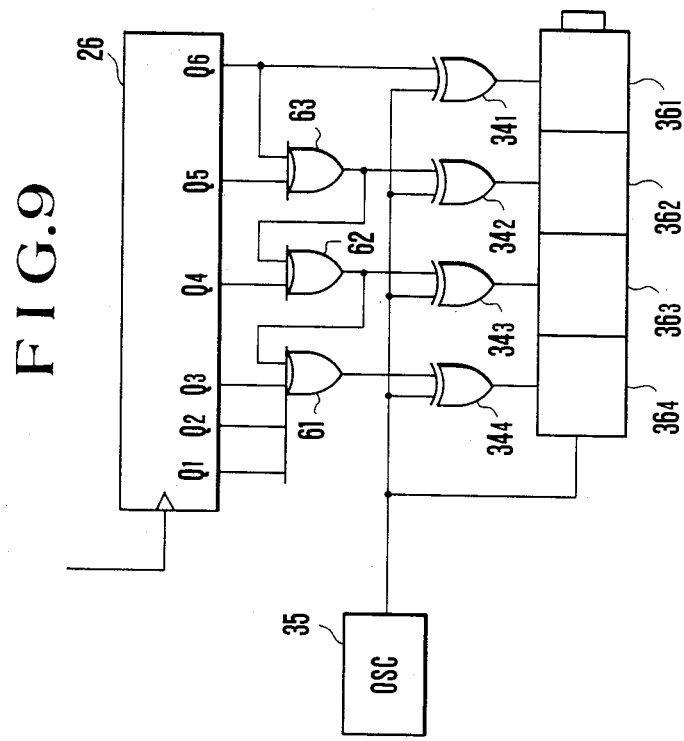
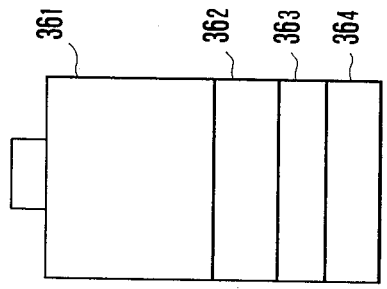
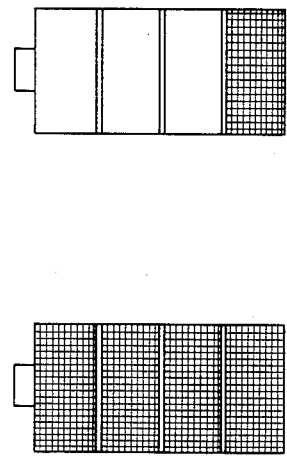

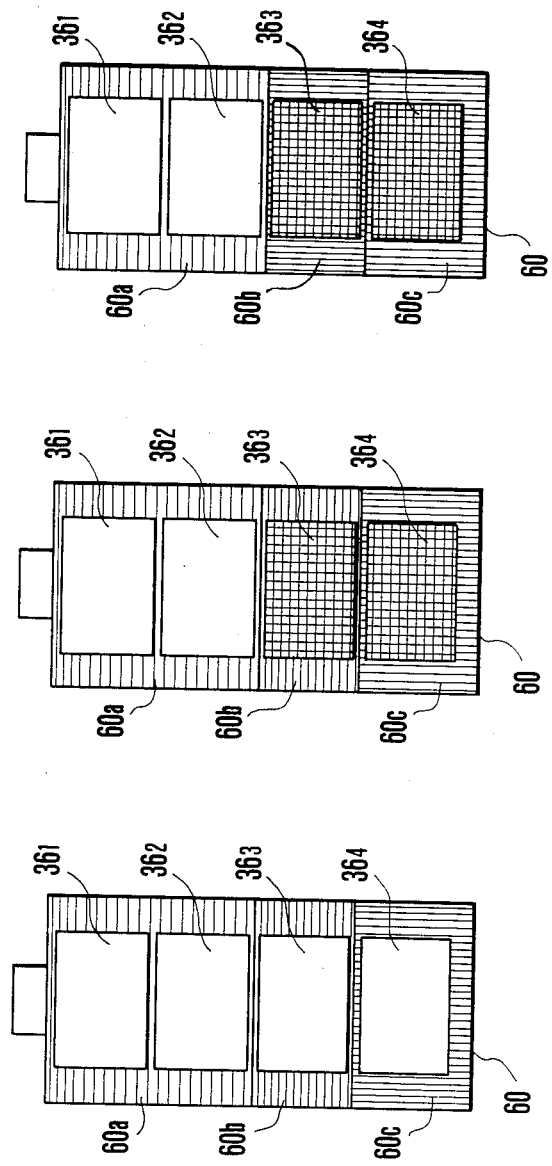

BATTERY CHECKING CIRCUIT

BACKGROUND OF THE INVENTION

This invention relates to battery checking circuits suited to cameras whose electrical power source is, for example, a lithium battery.

DESCRIPTION OF THE PRIOR ART

Cameras and similar instruments are rapidly advancing in automation. This has increased the necessity for performing battery checks. In the conventional cameras, it has been the common practice first to push down the release button partly so that, before the shutter is released, current is supplied once to a release magnet to determine whether or not the camera operates normally. For a battery check, the operator must first connect the used battery to the magnet and then monitor the level the actual voltage of the battery takes over a certain time. If that level is found to be lower than a prescribed value, the operator assumes that satisfactory operation of the camera cannot be ensured with the battery then loaded in the camera.

Such a battery checking process includes a step that does not essentially contribute to taking a picture. Therefore, the ability to take snapshots has often been impeded, and a large amount of electrical energy has been wasted.

Often the electrical power source of the camera is a lithium battery or a other large capacity battery which can be accommodated within the interior of the camera. This increases the demand for savings in consumption of electrical energy to prolong the lifetime of the battery, and to reduce the number of times the battery need be changed.

SUMMARY OF THE INVENTION

A first object of the present invention is to eliminate the above-described drawbacks and to count the number of cycles of operation of a camera or like instrument after a new battery is loaded, based on which the remaining amount of electrical energy of the battery is visually displayed.

A second object of the invention is to also count the number of cycles of operation of an accessory device when the remaining amount of energy of the battery is visually displayed.

A third object of the invention is to take into consideration the length of time for which the accessory device operates when the remaining amount of energy of the battery is visually displayed.

A fourth object of the invention is to vary the indicated unusable range of the battery with temperature.

A fifth object of the invention will become apparent from the following description of embodiments thereof.

BRIEF DESCRIPTION OF THE DRAWINGS

FIG. 1 is a diagram of a first embodiment of a battery checking circuit for a camera according to the present invention.

FIG. 2(a) is a plan view of the display portion of FIG. 1 when the battery is full of energy.

FIG. 2(b) is a similar view of FIG. 2(a) except that the energy of the battery is used up to the last degree.

FIG. 7(a) is a plan view of a liquid crystal display portion of each of the foregoing figures provided with a display frame, FIG. 7(b) is a similar view of the frame of FIG. 7(a) at the normal temperature, and FIG. 7(c) is a similar view of the frame of FIG. 7(a) at a low temperature.

FIG. 8 is a plan view of an example of modification of the liquid crystal display device of FIGS. 2 or 7.

FIG. 9 is a diagram of a control circuit for the liquid crystal display device of FIG. 8.

DETAILED DESCRIPTION OF THE PREFERRED EMBODIMENTS

Figure 3:
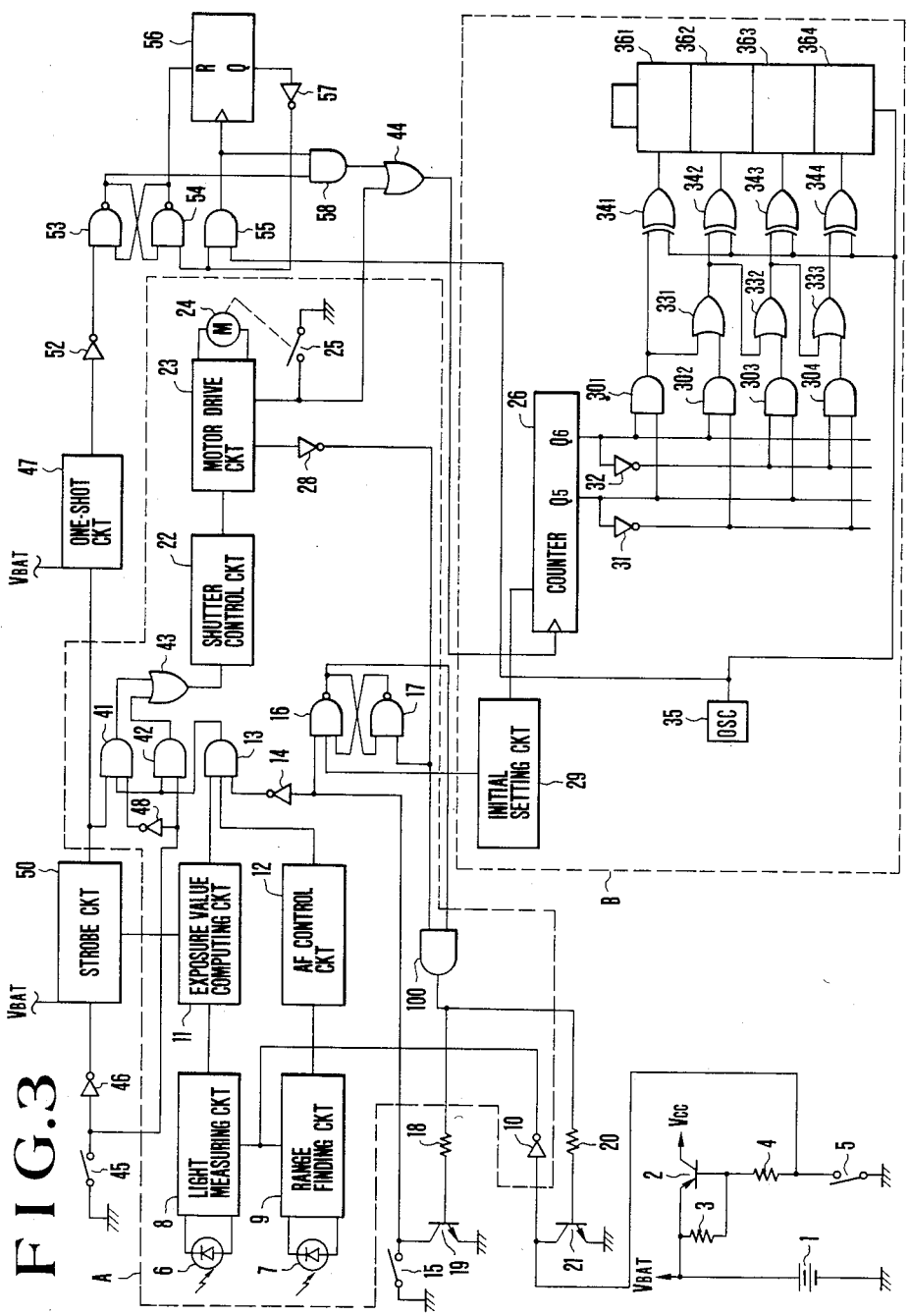
FIG. 3 is a diagram of a second embodiment of the battery checking circuit for the camera according to the present invention.

The present invention will next be described in connection with embodiments thereof by reference to the drawings. Referring first to FIG. 1 and FIGS. 2(a) and 2(b), there is shown a first embodiment of the invention, to a first stroke. A photosensitive element 6 measures switching transistor 2 has an emitter electrode connected to the positive terminal of the battery 1 and a collector connected to all circuit portions except a circuit enclosed within a dashed line block. A voltage $V_{BAT}$ from the battery 1 is always applied to the circuit within the dashed line block. A resistor 3 is connected between the emitter and base of the transistor 2, the base thereof being connected through a resistor 4 to the output of a switch 5 which is arranged to be closed when a release button is pushed down to a first stroke. 6 is a photosensitive element for measuring the brightness of an object to be photographed. A photosensitive element 7 is positioned to receive the reflection of a projecting light beam from the object for automatic focusing purposes. Information from the first photosensitive element 6 is processed by a range finding signal processing circuit 8, and information from the second photosensitive element 7 is processed by a circuit 9. These processing circuits 8 and 9 are rendered operative when the switch 5 is closed, as a signal of low level after having been inverted by an inverter 10 is aplied thereto. The output of the light metering signal processing circuit 8 is applied to an exposure value computing circuit 11. The output of the range finding signal processing circuit 9 is applied to a automatic focusing (AF) control circuit 12 to drive a lens barrel (not shown). The outputs of the circuits 11 and 12 and an inverter 14 are applied to an AND gate 13. This inverter 14 inverts a signal of low level produced from a switch 15 when the release button is pushed to a second stroke. This signal is also applied to a NAND gate 16 constituting a flip-flop together with a NAND gate 17. The output of the NAND gate 16 is applied through a resistor 18 to the base of a transistor 19 whose collector-to-emitter path is connected across the switch 15, and also through a resistor 20 to the base of a transistor 21 whose collector-to-emitter path is connected across the switch 5. The output of the AND gate 13 is connected to an input of a shutter control circuit 22. At the termination of an operation of the shutter control circuit 22, a motor drive circuit 23 starts to operate. The drive circuit 23 energizes an electric motor 24 to advance a film one frame by one frame. For every one frame, a switch 25 turns off and on once. A signal produced by such an operation of the switch 25 is applied to the drive circuit 23 and a counter 26. When each cycle of film winding operation is completed, the drive circuit 23 produces an output signal which is applied through an inverter 28 to the NAND gate 17. This signal takes a high level when the operation of the drive circuit 23 terminates, and a low level when it is inoperative. The counter 26 is reset by a circuit 29 when the batery 1 is replaced by a new one. Another output of this initial condition setting circuit 29 is connected to the NAND gate 16 so that when the voltage Vcc appears at the circuit 29, a signal of low level is given to the NAND gate 16, whereby the output of the NAND gate 16 is changed to low level. A signal from the output stage Q5 of the counter 26 is applied to AND gates $30_1$ and $30_3$ and also through an inverter 31 to AND gates $30_2$ and $30_4$. A signal from the output stage Q6 of the counter 26 is applied to the AND gates $30_1$ and $30_2$ and also through an inverter 32 and to AND gates $30_3$ and $30_4$. These AND gates $30_1$ to $30_4$ and the inverters 31 and 32 constitute a decoder. An OR gate $33_1$ has two inputs connected to the respective outputs of the AND gates $30_1$ and $30_2$, an OR gate $33_2$ has two inputs connected to the respective outputs of the OR gate $33_1$ and the AND gate $30_3$, and an OR gate $33_3$ has two inputs connected to the respective outputs of the OR gate $33_2$ and the AND gate $30_4$. Exclusive OR gates $34_1$ to $34_4$ are connected in their one inputs to the output of a clock pulse oscillator 35 and constitute a driver for a display device 36. The other inputs of the exclusive OR gates $34_1$ to $34_4$ are connected, respectively, to the outputs of the AND gate $30_1$ and the OR gates $33_1$, $33_2$ and $33_3$. The inverters 31 and 32, AND gates $30_1$–$30_4$, OR gates $33_1$–$33_3$ and exclusive OR gates $34_1$–$34_4$ constitute a display control circuit. Four liquid crystal light shutter display elements $36_1$ to $36_4$ each are formed to a rectangular shape as shown in FIGS. 2(a) and 2(b). Applied to these display elements $36_1$ to $36_4$ are the outputs of the exclusive OR gates $34_1$ to $34_4$ and the output of the clock pulse oscillator 35.

The operation of the circuit of FIG. 1 will now be described. When the battery 1 is replaced, the initial condition setting circuit 29 sets all the outputs of the counter 26 to high level. Then, when the release button is pushed down to the first stroke, the switch 5 turns on, whereby the transistor 2 is turned on. Appearing at the collector of the transistor 2, the voltage Vcc is applied to all the circuit portions except the dashed line block. By the closure of the switch 5, the output of the inverter 10 changes to high level, initiating an operation of each of the processing circuits 8 and 9. At the terminations of exposure value computing and focusing operations, the computer circuit 11 and the control circuit 12 produces signals of high level. Then, when the release button is further pushed down to the second stroke, the switch 15 turns on, whereby the output of the inverter 14 is changed to high level. Responsive to this, the AND gate 13 changes its output to high level, initiating an operation of the shutter control circuit 22. As the shutter is opened for a proper time with a diaphragm at a proper size of aperture opening thereof, when the shutter is closed, the shutter control circuit 22 changes its output to high (H) level, causing the next stage or motor drive circuit 23 to start rotation of the motor 24. Thus, the exposed one frame of film is moved away from the exposure aperture while being wound up on a take-up spool. As the motor 24 rotates, the switch 25 moves, performing one cycle of ON-to-OFF-to-ON operation. That is, for every oen cycle of film winding opreation,
the switch 25 once turns off and on once. When it ends, the motor drive circuit 23 produces a signal of high level, and the inverter 28 produces an output of low level.

The NAND gates 16 and 17 function to latch the condition of the switch 15. When the switch 15 turns on, therefore, the output of the NAND gate 16 becomes high level. The NAND gate 16 output is maintained at high level until the output of the inverter 28 becomes low level. Because, during the time when this signal of high level is present, base current flows to the transistors 19 and 21 through the resistors 18 and 20, the transistors 19 and 21 are sustained in the conducting state even if the switches 5 and 15 are turned off before the output of the motor drive circuit 25 becomes high level.

As the camera operation is recycled, the counter 26 is counting the number of performed cycles of OFF-to-ON operation of the switch 25. The decoder constructed of the inverters 31 and 32 and the AND gates $30_1$ and $30_4$ decodes the 5th and 6th ones of the bits of the counter 26. For binary values (1,1) of the 6th and 5th bits at the outputs Q6 and Q5 respectively, the output of the AND gate $30_1$ has high level, exclusive of all other outputs. For (1,0), the AND gate $30_2$, is selected to produce the output of high level. For (0,1), the AND gate $30_3$ is selected. For (0,0), the AND gate $30_4$ is selected. Therefore, as the counter 26 counts down the clock pulses from the switch 25, since the counter 26 has all of its outputs at a high level, for the output stages Q6 and Q5 of the counter 26 to reach (1,0) from (1,1), the counter 26 has to count down 16 clock pulses. For them to reach (0,1), the counter 26 has to count down 32 clock pulses. For them to reach (0,0), 48 clock pulses must be counted down. When the output of the AND gate $30_1$ is at the high level, one input of all the exclusive OR gates $34_1$ to $34_4$ are all of high level so that the clock pulses from the oscillator 35 are passed therethrough to all of the liquid crystal light shutter display elements $36_1$ to $36_4$. Looking at the display device as shown in FIG. 2(a), the operator sees that the battery 1 is full of energy. When the output of high level is shifted to the AND gate $30_2$, the display elements $36_2$ to $36_4$ are energized. When it is further shifted to the AND gate $30_3$, the two display elements $36_3$ and $36_4$ are energized. When the output of the AND gate $30_4$ is of high level, only the one exclusive OR gate $34_4$ is given the high level, and the fourth or bottom display element $36_4$ only is energized. Looking at the display device as shown in FIG. 2(b), the operator sees that the battery 1 has little energy left. In such a manner, as the electrical energy stored in the battery decreases, the display elements $36_1$ to $36_4$ extinguish one by one from the top.

Though the foregoing or first embodiment has been described in connection with the clock pulse source for the counter in the form of the switch cooperating with the motor, it is to be understood that the present invention is not confined thereto. Whatever is able to represent one cycle of camera operation may be made use of. For example, the signal representing the termination of the shutter operation from the shutter control circuit may be used as the clock pulse. Another example of variation is that instead of the same number of cycles of camera operation in each transition from one display element to the next, the required cycle number for each of a prescribed number of last transitions may be progressively decreased.

In the first embodiment described above, the remaining amount of energy of the battery can be visibly displayed depending upon the number of cycles of camera operation carried out.

Referring next to FIG. 3, there is shown a second embodiment of the invention, where the same reference characters have been employed to denote the similar parts to those shown in FIG. 1. The shutter control circuit 22 is otherwise made responsive to the output of an OR gate 43. Also, it is through an OR gate 44 that the signal from the switch 25 is applied to the counter 26.

A strobe circuit 50 starts to be charged when a trigger switch 45 is closed, as a signal of low level after inversion by an inverter 46 is applied thereto. This strobe circuit 50 has two outputs, one of which represents the value of guide number which is factored into the flash exposure value by the exposure value computing circuit 11. Another output takes the high level when a storage capacitor therein is fully charged, and is applied to an AND gate 41 and a one-shot circuit 47. The output of the switch 45 is also connected to an AND gate 42 and through an inverter 48 to the AND gate 41. The parts 41, 42, 43 and 48 are so arranged that even if the switch 45 turns on and the switches 5 and 15 turn on, the shutter control circuit 22 is not actuated until the strobe circuit 50 is charged to a voltage of magnitude high enough to fire the discharge lamp and produces an output of high level. NAND gates 53 and 54 constitute a flip-flop. Connected to one input of the NAND gate 53 is the output of the one-shot circuit 47 through an inverter 52. A counter 56 has a "reset" terminal connected to the output of the NAND gate 54, and has an output terminal Q connected through an inverter 57 to an input of an AND gate 55 and the input of the NAND gate 54. The other input of this AND gate 55 is connected to the output of the oscillator 35. The output of this AND gate 55 is connected to a clock input terminal of the counter 56. An AND gate 58 has two inputs connected to the outputs of the NAND gate 53 and the AND gate 55 respectively and has an output connected through the OR gate 44 to the input of the counter 26.

The operation of the circuit of FIG. 3 will not be described: The initial condition setting circuit 29 responsive to replacement of the battery 1 sets all the outputs of the counter 26 to high level. When the switch 5 is turned on by the first stroke of depression of the release button, the transistor 2 turns on, supplying current to all the circuit portions, and the output of the inverter 10 changes to high level, initiating operations of the processing circuits 8 and 9. When an exposure value is derived and the focusing adjustment is completed, the circuits 11 and 12 produce output signals of high level.

If, at this time, the switch 45 is OFF, the output of the inverter 48 is of low level. Also, if the output of the AND gate 13 is of high level, the AND gate 42 produces an output of high level which is applied through the OR gate 43 to the shutter control circuit 22. On the other hand, when the switch 45 is turned on, the AND gate 42 is gated off. But because the output of the inverter 48 changes to high level, it is when the strobe circuit 50 becomes ready to fire that the AND gate 41 is gated on to pass the output of the AND gate 13 to the shutter control circuit 22 through the OR gate 43. As the release button is in the second stroke, when the switch 15 turns on, the output of the inverter 14 changes to high level, causing the output of the AND gate 13 to change to high level, and, therefore, causing an operation of the shutter control circuit 22 to be initiated. The shutter is then opened for a proper time with the diaphragm at a proper aperture opening. When the shutter closes, the circuit 22 changes its output to the high level, causing the drive circuit 23 to start rotation of the motor 24. Here, the film is advanced one frame. Meanwhile, as the motor 24 rotates, the switch 25 turns first off and then on. When that cycle of film winding operation is completed, the motor drive circuit 23 produces an output signal of the high level, and the output of the inverter 28 becomes low level.

The NAND gates 16 and 17 latch the state of the switch 15. Therefore, when the switch 15 turns on, the output of the NAND gate 16 is changed to and maintained at the high level until the output of the inverter 28 becomes low level. Before this, the transistors 19 and 21 remain conducting even if the switches 5 and 15 are turned off. When the output of the inverter 28 becomes low level, the output of the AND gate 100 also becomes low level, so that the transistors 19 and 21 are turned off.

When the strobe circuit 50 is readied to fire, the one-shot circuit 47 produces a pulse of short duration. The output of the inverter 52 is then instantaneously lowered, actuating the latch circuit constructed of the NAND gates 53 and 54. Therefore, the output of the NAND gate 53 becomes high level, and the output of the NAND gate 54 becomes low level, whereby the counter 56 is released from the resetting. As this counter 56 then counts the clock pulses from the clock pulse oscillator 35, when the number of pulses counted reaches a certain value, the output Q of the counter 56 changes to high level, and the output of the inverter 57 changes to low level. Responsive to this, the AND gate 55 changes its output to low level, cutting off the supply of clock pulses to the counter 56, and the flip-flop constructed of the NAND gates 53 and 54 changes its output to high level, resetting the counter 56, or the content of the counter 56 to zero. As a result, the AND gate 58 produces a pulse. As the camera operation and the strobe operation are recycled, the sum of the number of pulses from the AND gate 58 and the number of cycles of OFF-to-ON operation of the switch 25 are counted down by the counter 26 through the OR gate 44.

The 5th and 6th bit positions of the counter 26 are decoded by the decoder constructed of the inverters 31 and 32 and AND gates $30_1$ to $30_4$. For a combination of input values (1,1) from the output terminals Q6 and Q5 of the counter 26 respectively, the decoder produces the output of high level at the AND gate $30_1$. For (1,0), the output of the AND gate $30_2$ has high level. For (0,1), the output of the AND gate $30_3$ has high level. For (0,0), the output of the AND gate $30_4$ has high level.

After all the outputs of the counter 26 have initially been set to the high level, when the sum of the pulse number and the cycle number counted reaches 16, the values of the 6th and 5th bits of the counter 26 change from (1,1) to (1,0). When the sum reaches 32, they change to (0,1). When the sum reaches 48, they change to (0,0). When the output of the AND gate $30_1$ is high level, this high level is applied to all the exclusive OR gates $34_1$ to $34_4$, passing the clock pulses from the oscillator 35 to all the liquid crystal light shutter display elements $36_1$ to $36_4$. Looking at the display device as shown in FIG. 2(a), therefore, the operator can see that the battery 1 is full of energy. When the output of the AND gate $30_2$ is high level, the display elements $36_2$–$36_4$ are energized. When the output of the AND gate $30_3$ is high level, the display elements $36_3$, $36_4$ are energized. When the output of the AND gate $40_4$ is high level, the high level is applied only to the exclusive OR gate $34_4$, whereby only the display element $36_4$ is energized. Looking at the display device as shown in FIG. 2(b), the operator can see that the battery has little energy left. Thus, the liquid crystal light shutter display elements $36_1$ to $36_4$ change their appearance from dark to white successively from the top as the number of cycles of camera operation increases with decrease in the remaining amount of electrical energy of the battery 1.

Figure 4:
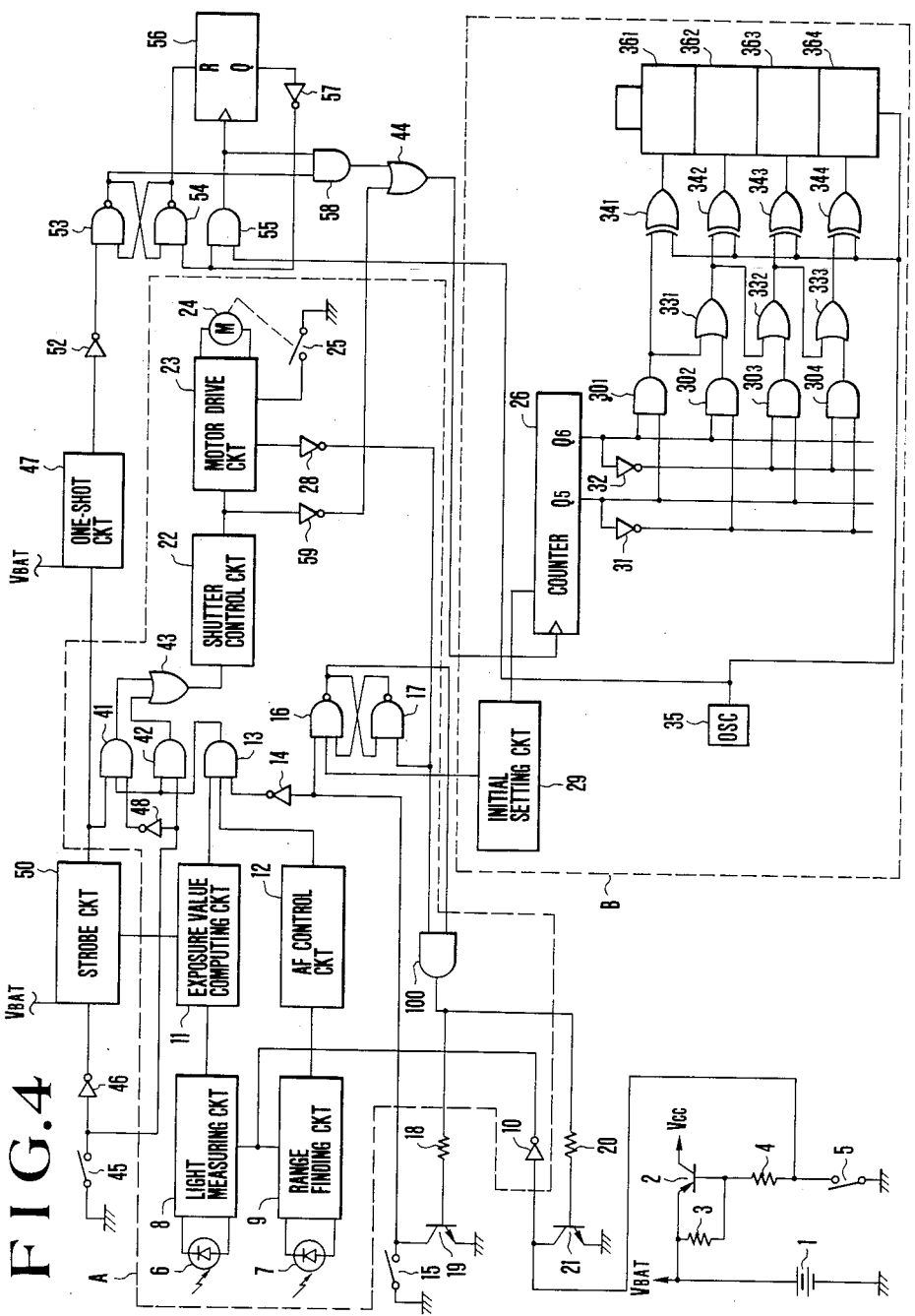
FIG. 4 is a diagram of an example of modification of the battery checking circuit of FIG. 3.

Though the foregoing or second embodiment has been described in connection with the clock pulse source for the counter in the form of a switch cooperating with the motor, it is to be understood that the present invention is not confined thereto. Whatever can represent each cycle of camera operation may be made use of instead of the clock pulse. For example, as shown in FIG. 4, the output signal of the shutter control circuit may be applied through an inverter 59 to the OR gate 44.

It should be recognized that in the second embodiment, when the flash unit as an accessory device is in use, the amount of electrical energy used up to recycle the charging of the storage capacitor is also taken into account in determining the remaining amount of electrical energy of the battery, thereby giving an advantage of improving the reliability of displaying how many more cycles of camera or camera-with-accessory operation can be carried out without having to exchange the battery 1.

Figure 5:
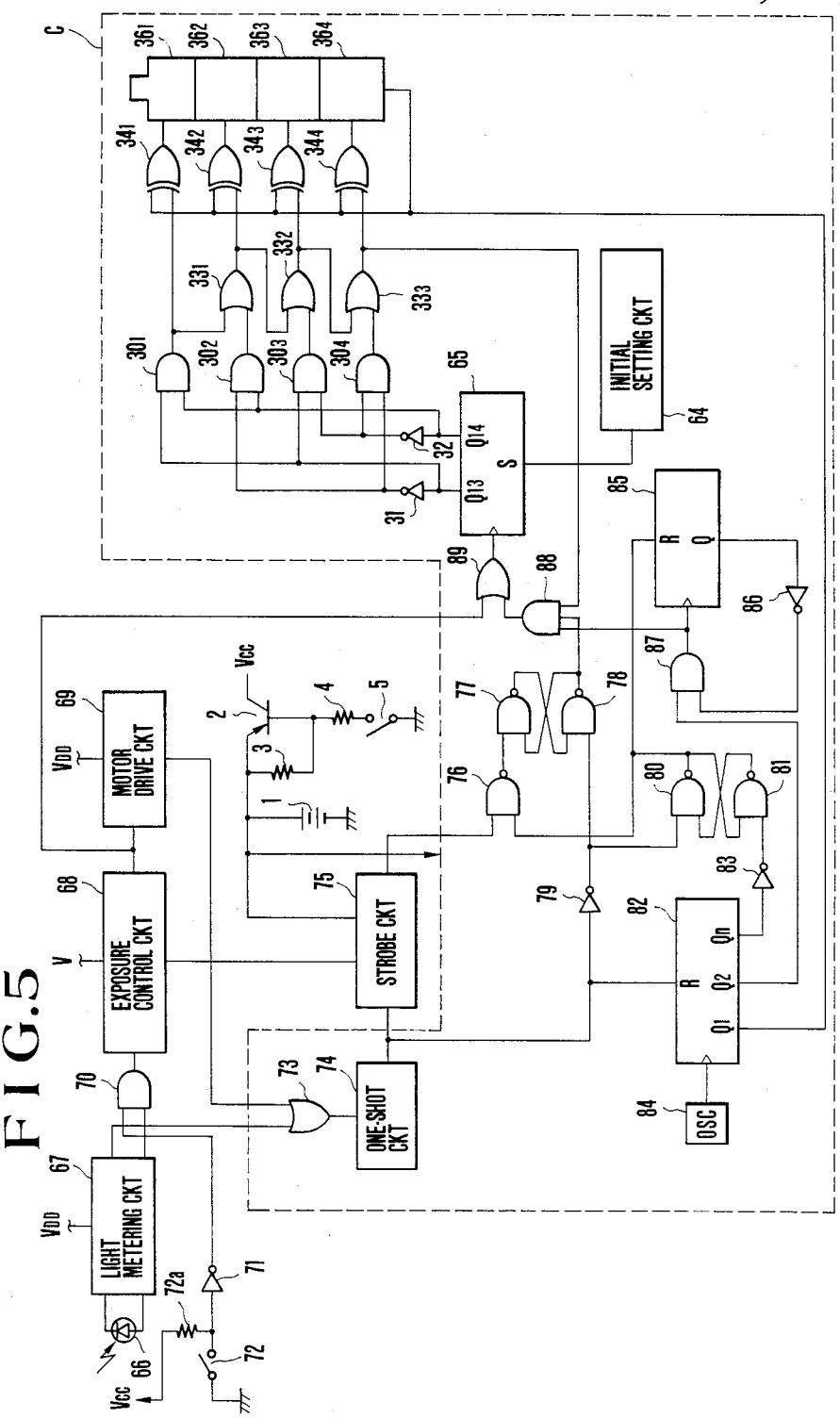
FIG. 5 is a diagram of a third embodiment of the battery checking circuit according to the invention.

Referring next to FIG. 5, there is shown a third embodiment of the invention, where the same reference characters have been employed to denote the similar parts to those shown in FIG. 1. Element 1 is an electrical power source or battery. A switching transistor 2 has its emitter electrode connected to the positive terminal of the battery 1 and has a collector electrode from which a voltage Vcc is applied to all the circuit portions such as a light metering circuit 67, an exposure control circuit 68, and a motor drive circuit 69, except circuit portions within a dashed line block C, and a strobe circuit 75 to which the voltage Vcc is always supplied from the battery 1. A photosensitive element 66 is positioned to receive light from an object, and constitutes part of the light metering circuit 67. This light metering circuit 67 is rendered operative when the switch 5 is closed. The exposure control circuit 68 has its input connected through an AND gate 70 to the output of the light metering circuit 67 and includes a circuit responsive to termination of a current supply to the shutter as an exposure completion signal for producing a pulse. By this exposure control circuit 68, the shutter is controlled. The other input of the AND gate 70 is connected to the output of an inverter 71.

This inverter 71 inverts a signal of low level produced by closing a switch 72 when the release button is pushed to a second stroke. Element 72a is a resistor. A motor drive circuit 69 is started by the exposure completion signal from the exposure control circuit 69. A winding completion signal from the motor drive circuit 69 and a brightness signal from the light metering circuit 67 are applied to an OR gate 73, whose output is applied to a one-shot circuit 74. Responsive to a pulse from the one-shot circuit 74, a strobe circuit 75 starts to be charged. This probe circuit 75 sends information for proper flash exposure to the exposure control circuit 68. When the strobe circuit 75 is fully charged, a signal of high level is applied to a NAND gate 76. NAND gates 77 and 78 constitute a flip-flop. Applied to the NAND gate 78 is the output of the one-shot circuit 74 after having been inverted by an inverter 79. NAND gates 80 and 81 constitute a flip-flop. The output of the inverter 79 is also applied to the NAND gate 80. Applied to the NAND gate 81 is a signal from an output terminal Qn of a frequency divider 82 through an inverter 83. The clock input terminal of this divider 82 is connected to the output of a clock pulse oscillator 84. The reset terminal R of the divider 82 is connected to the output of the one-shot circuit 74. A counter 85 has its reset terminal connected to the output of the NAND gate 80. An output terminal Q of this counter 85 is connected through the inverter 86 to an AND gate 87. Another input of this AND gate 87 is connected to an output stage Q2 of the frequency divider 82. The output of this AND gate 87 is connected to the clock input terminal of the counter 85. An AND gate 88 has its three inputs connected to the outputs of the NAND gate 78, the OR gate $33_3$ and the AND gate 87, and its output is connected through an OR gate 89 to the down counter 65. Another input of this OR gate 89 is connected to the output of the exposure control circuit 68. Responsive to replacement of the battery 1, the initial condition setting circuit 64 resets the counter 65. A signal from an output stage Q13 of the counter 65 is applied to the AND gate $30_1$ and $30_3$ and also through the inverter 31 to the AND gates $30_2$ and $30_4$. A signal from another output stage Q14 of the counter 65 is applied to the AND gates $30_1$ and $30_2$ and also through the inverter 32 to the AND gates $30_3$ and $30_4$. The display control circuit including these AND gates 30, inverters 31 and 32 is similar to that in the foregoing embodiments, except that an output Q1 of the frequency divider 82 is connected to the exclusive OR gates $34_1$ to $34_4$ and the display device 36.

The operation of the circuit of FIG. 5 will now be described: When the battery 1 is replaced by a new one, the initial condition setting circuit 64 sets all the outputs of the counter 65 to high level. The operator then pushes the release button to a first stroke, whereby the switch 5 is turned on. Therefore, the transistor 2 turns on to pass the voltage Vcc of the battery 1 to the various circuit portions. The light metering circuit 67 then starts to process the output of the photosensitive element 66. If the object brightness is lower than a prescribed level, the one of the two outputs of the light metering circuit 67 which is connected to the OR gate 73 takes "H" level. When the light metering operation terminates, the other output takes "H" level. The operator then further depresses the release button to the second stroke, and the switch 72 turns on, causing the output of the inverter 71 to change to "H", and the output of the AND gate 70 to change to "H" level. Therefore, the exposure control circuit 68 is rendered operative, initiating an operation of the shutter. At the termination of the shutter exposure operation, the exposure control circuit 68 produces the signal representing the completion of the exposure. This signal is applied through the OR gate 89 to the counter 65 and also to the motor drive circuit 69. Thus, the film is advanced by one frame.

When this film winding operation terminates, the motor drive circuit 69 produces a signal representing the termination of the winding operation which is applied to the OR gate 73. Therefore, either when the object brightness is detected as dark or each time the film winding operation terminates, the output of the OR gate 73 becomes "H". Each time the output of the OR gate 73 changes to "H", the one-shot circuit 74 produces one pulse. Thereby, charging of a main condenser (not shown) in the strobe circuit 75 is recycled. Also, the one pulse from the one-shot circuit 74 is used for resetting the frequency divider 82, and the flip-flops 77, 78 and 80, 81.

When the voltage stored on the main condenser reaches a threshold level, the strobe circuit 75 produces an "H" signal which is applied to the NAND gate 76. Meanwhile, because the frequency divider 82 was reset at the same time the main condenser started to be charged, the time it takes for the condenser to be fully charged can be measured. If the required value of the time for this is 1 second, as the output Qn of the frequency divider 82 change to "H" in one second form the time of resetting, the output of the NAND gate 80 is maintained at "H" for 1 second after the frequency divider 82 is reset, and later changes to "L".

(1) Now assuming that the signal representing the termination of the charging operation is produced within 1 second from the strobe circuit 75, then the output of the NAND gate 76 changes to "L" when the signal appears. Responsive to this, the AND gate 78 changes its output to "L". In 1 second from the start of operation of the strobe, the output of the NAND gate becomes "L", releasing the counter 85 from the resetting. As the counter 85 then counts the pulses from the output terminal Q2 of the frequency divider 82, when the number of pulses counted reaches a certain value, the Q output of the counter 85 changes to "H", and, therefore, the output of the inverter 86 changes to "L", whereby the AND gate 87 is gated off. In other words, after one second from the start of charging, the AND gate 87 starts to produce a prescribed number of pulses. Though these pulses arrive at the AND gate 88, because the AND gate 88 is being gated off by the "L" output of the NAND gate 78, the counter 65 counts none of them. Therefore, the fact that the signal representing the termination of the charging operation is produced in a shorter time than 1 second as measured from the actuation of the strobe implies that the main condenser previously stores as much a charge as is near the threshold level, and is, therefore, soon fully charged, so that the amount of electrical energy used in this cycle of charging operation is considered to be small. For this reason, neglecting this cycle of strobe operation, the counter 65 does not count any pulse.

(2) Alternatively, assuming that the full charging signal is not produced within 1 second from the strobe circuit 75, then in 1 second from the actuation of the strobe, the output of the NAND gate 80 becomes "L", leaving the output of NAND gate 76 at "H" and the output of NAND gate 78 at "H". Therefore, the AND gate 88 passes the prescribed number of pulses from the AND gate 87 to the OR gate 89 and therefrom to the counter 65. Thus, the down counter 65 counts down one pulse from the exposure control circuit 68 for each cycle of camera operation and the prescribed number of pulses from the AND gate 88 for each cycle of longer-than-1-second strobe operation.

The 13th and 14th bit positions of the counter 65 are decoded by the decoder constructed of the inverters 31 and 32 and the AND gate $30_1$ to $30_4$. For a combination of values (1,1) of the signals from the output terminals Q14 and Q13 of the counter 65 respectively, the output of the AND gate $30_1$ has high level. For (1,0), the output of the AND gate $30_2$ has high level. For (0,1), the output of the AND gate $30_3$ has high level. For (0,0), the output of the AND gate $30_4$ has high level. Since the counter 65 in the initial state has its outputs all in high level, for the outputs Q14 and Q13 of the counter 65 to change from (1,1) to (1,0), the counter 65 has to count 4,096 clock pulses. Until (0,1), the counter 65 counts 8,192 clock pulses. Until (0,0), the counter 65 counts 12,288 clock pulses. When the output of the AND gate $30_1$ is of high level, the high level is applied to all the exclusive OR gates $34_1$ to $34_4$ so that all the liquid crystal light shutter display elements $36_1$ to $36_4$ are allowed to be energized in response to the pulses from the output terminal Q1 of the frequency divider 82. Looking at the display device 36, the operator can see that the battery 1 is full of energy. When the output of the AND gate $30_2$ is of high level, the last three display elements $36_2$ to $36_4$ are allowed to be energized. When the output of the AND gate $30_3$ is of high level, the last two display elements $36_3$ and $36_4$ are allowed to be energized. When the output of the AND gate $30_4$ is of high level, the high level is applied only to the exclusive OR gate $34_4$, whereby the last display element $36_4$ is allowed to be energized. Looking at the display device, the operator can see that almost no more energy is available from the battery 1. In such a way, as the amount of electrical energy used up increases, the liquid crystal light shutter display elements $36_1$ to $36_4$ change their appearance from dark to white successively from the top.

Figure 6:
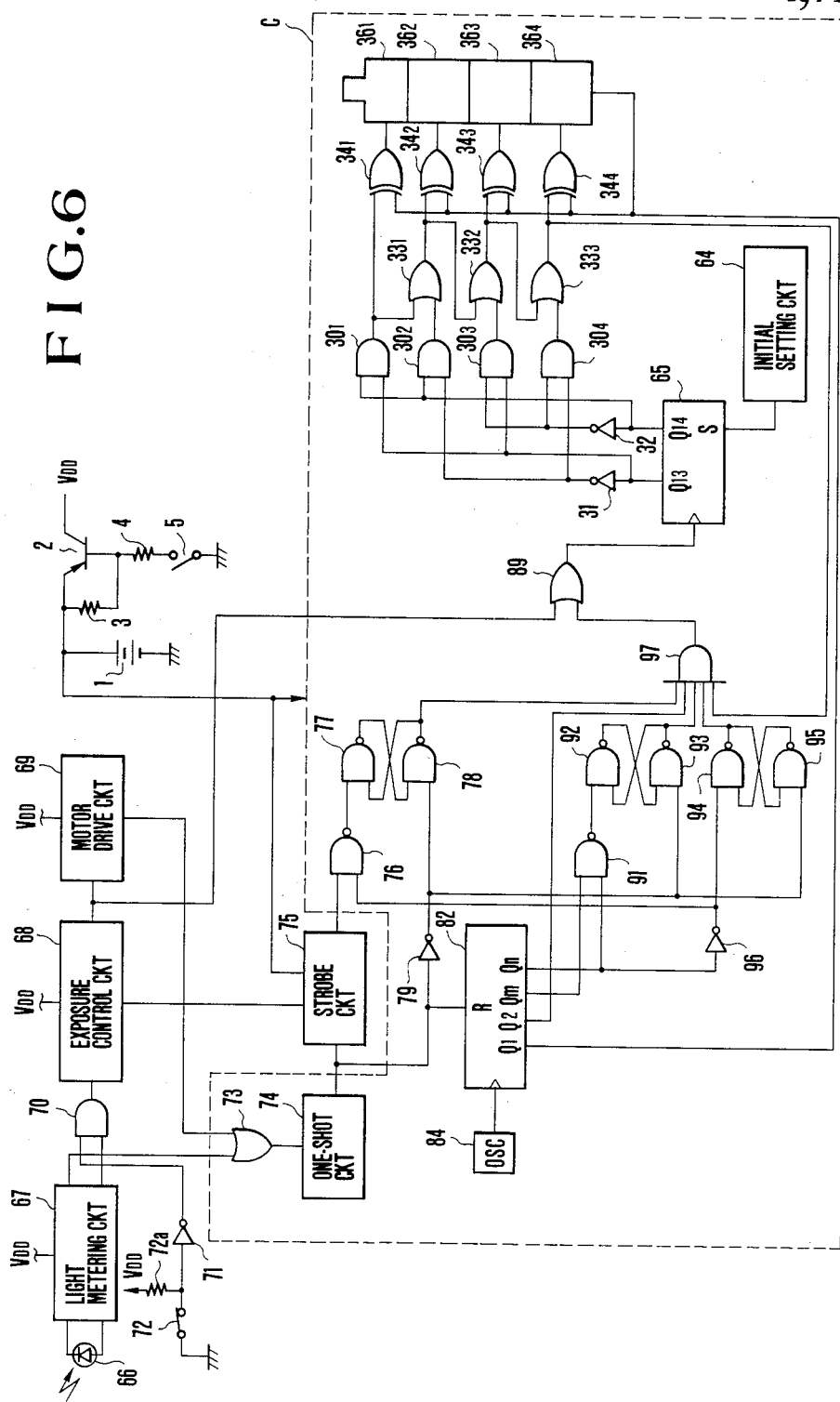
FIG. 6 is a diagram of an example of modification of the circuit of FIG. 5.

FIG. 6 illustrates an example of variation of the circuit of FIG. 5 where the similar parts to those shown in FIG. 5 are denoted by the same reference characters and are not explained here.

A NAND gate 91 has its two inputs connected to the output terminals Qm and Qn of the frequency divider 82. NAND gates 92 and 93, and 94 and 95 constitute flip-flops. The output of the NAND gate 91 is connected to the input of the NAND gate 92. The output of the inverter 79 is also connected to the inputs of the NAND gates 93 and 95. The output terminal Qn of the frequency divider 82 is connected through an inverter 96 to the inputs of the NAND gates 76 and 94. An AND gate 97 has five inputs which are connected respectively to the outputs of the NAND gates 78, 93 and 94, the output terminal Q2 of the frequency divider 82 and the output of the OR gate $33_3$, and has an output which is connected through the OR gate 89 to the counter 65.

Next, explanation is given of the operation of the circuit of FIG. 6. But, because the function of the circuit of FIG. 6 is different from that of the circuit of FIG. 5 in how to form pulses which are to be applied to the counter 65, the following explanation is made about the manner in which the pulse forming circuit operates.

When charging of the strobe is started, the oneshot circuit 74 produces one pulse which is then applied to reset the frequency divider 82 for the purpose of determining whether or not the charging is completed within a prescribed time (for example, 1 second).

(1) Assume that the signal representing the termination of the charging operation appears within 1 second. Because the output Qn of the frequency divider 82 is "L", the output of the inverter 96 becomes "H". By the instantaneous output of "H" from the one-shot circuit 74, the flip-flops of the NAND gates (77,78), (92,93) and (94,95) are respectively set, set and reset. By the way, it is at a time during the period when the output of the inverter 96 is "H" that the full charging signal of "H" enters the NAND gate 76. Therefore, the output of the NAND gate 76 changes to "L", causing the output of the NAND gate 78 to change to "L".

After that, when the output Qn of the frequency divider 82 becomes "H", the output of the inverter 96 changes to "L", whereby the flip-flop constructed of the NAND gates 94 and 95 is set. After that, when the outputs Qm and Qn of the frequency divider 82 both take "H", the output of the NAND gate 91 changes to "L" and, the flip-flop of the NAND gates 92 and 93 is reset. The period of the output Qm is assumed to be equal to a number of times, for example, four times, the period of the output Q2. That is, the time interval from the moment at which the output of the NAND gate 94 has become "H" to the moment at which the output of the NAND gate 93 changes to "L" is equal to the time of four pulses at the output Q2 of the frequency divider 82. But, because the output of the NAND gate 78 becomes "L" before the output Q2 changes from "L" to "H", the output of the AND gate 97 remains "L". For this reason, if the signal representing the termination of the charging operation is obtained within 1 second, no pulse is given to the counter 65 through the OR gate 89.

(2) Assume that the charging end signal is not obtained within 1 second. Since the output of the NAND gate 76 never becomes "L", the output of the NAND gate 78 remains "H". Therefore, during the time when both of the NAND gates 93 and 94 are "H", the AND gate 97 passes the pulses of period Q2 from the frequency divider 82 therethrough. In this case, the number of pulses passed is 4.

It should be noted that the output of the OR gate $33_3$ is connected to one of the inputs of the AND gate 97 because when the output of the OR gate $33_3$ becomes "L", no more pulses are given to the counter 65.

Though the foregoing or third embodiment has been described in connection with the use of the signal representing the termination of the exposure operation from the exposure control circuit for representing one cycle of camera operation, it is to be understood that the present invention is not confined thereto. Whatever can detect one cycle of camera operation may be used instead. For example, a switch may be used as arranged to cooperate with the motor.

Also, in the foregoing embodiments, the time it takes for the signal representing the termination of the charging operation to appear is 1 second, on which determination of whether or not the counter is allowed to count one pulse depends. But, this time may be divided into a plurality of parts, for example, 0 to 0.5 sec., 0.5 to 1 sec. and more than 1 sec., so that which part it takes for the signal to appear is detected and the number of pulses counted for each cycle of strobe operation may be correspondingly varied.

Since, in the third embodiment, not only the number of shots taken but also the charging time of the strobe is factored into the content of the counter for determining what amount of electrical energy is left available in the battery, it is possible to improve the reliability of displaying the remaining amount of energy of the battery.

Another example of variation of each of the foregoing embodiments is that the liquid crystal display device is provided with means shown in FIG. 7. That is, the display areas $36_1$, $36_2$, $36_3$ and $36_4$ are surrounded by a frame 60. This display frame 60 is divided into three parts 60a to 60c of different color, for example, blue and red. As the remaining amount of energy of the battery decreases with increase in the number of cycles of operation of the instrument, the display areas change their appearance from dark to white one at a time from $36_1$ to $36_4$. And, so long as the top one of the areas which appears dark lies in the blue part of the frame, it shows that the battery has sufficient energy left. But when the top dark display area enters the red frame portion, it shows that the remaining amount of energy of the battery is so little as not to ensure the satisfactory operation of the instrument, and the operator is warned that there is need to replace the battery 1 with a new one. The intermediate part 60b is made of a head sensitive type cholesteric liquid crystal cell as is employed in thermometers so that under the action of polarizer, the frame portion 60b appears blue at the normal temperature, but changes its color to red at lowered temperatures. Thereby, as shown in FIGS. 7(b) and 7(c), even though the number of cycles of camera operation performed is the same with the display device appearing dark at the last two areas $36_3$ and $36_4$, because, at the normal temperature, the display frame portion 60b is blue, the battery is shown to be still usable. But, it is at a low temperature that the frame portion 60b changes to red as shown in FIG. 7(c), warning the photographer that the battery cannot ensure the satisfactory operation of the camera. By this, it is made possible to accurately display the power of the battery that varies with temperature without having to directly measure the actual voltage of the battery but using only the number of cycles of camera operation. Thus, even the variation of the ambient temperature is taken into account in determining whether or not the battery voltage is above the satisfactory operating level.

Furthermore, the display frame portion 60b may be made of a blue liquid crystal cell which changes its color to red when a voltage is applied. In this case, a known circuit which measures the ambient temperature is used for applying a voltage to the liquid crystal cell when the temperature is lower than a predetermined value.

Also, there is no need for the top dark display area to shift one step in the same number of cycles of camera operation. As shown in FIG. 8, the required cycle number may be progressively decreased as the shifting occurs from the intermediate prescribed area. For this purpose, as shown in FIG. 9, the most significant bit output and just the next significant bit output of the counter are combined by an OR gate of the decoder, as a modification of the display circuit of FIGS. 1, 3 and 4. The output of that OR gate 63 remains high level until 47 clock pulses are counted. The output of an OR gate 62 remains high level until 55 clock pulses are counted. The output of an OR gate 62 remains high level until 62 clock pulses are counted. Therefore, as the content of the counter decreases as a constant speed, the speed of shifting of the top dark area is progressively faster.

As has been described in greater detail above, according to the present invention, prior to making of a shot, the necessity of performing the battery checking operation which does not essentially contribute to photography but nevertheless takes a long time to complete is removed. Therefore, the snapshot capability is not caused to diminish. Another advantage is that because the decreasing of the amount of energy left in the battery is pictorially displayed, the photographer need not constantly take care of when the battery will have to be replaced. It is just before the battery is exhausted that the photographer may prepare a new battery. As the anxiety with the camera having the prior art battery checking device can be removed, the battery energy level display of the invention functions as a very effective battery checking device.

What is claimed is:

1. A battery checking circuit for a camera comprising:
   (a) a first pulse generating circuit for producing a number of pulses for each camera operation;
   (b) a circuit for an accessory operation associated with the camera;
   (c) a second pulse generating circuit for producing a number of pulses for each accessory operation;
   (d) a counter for counting and providing an output of the sum of the pulses produced from said first and said second pulse generating circuits;
   (e) display means for displaying the remaining amount of energy of a battery, said display means having a plurality of display areas arranged side by side; and
   (f) control means for controlling the operation of a plurality of display elements for said areas in accordance with the output sum of said counter, said control means causing said plurality of display areas to change their appearance from one side to another successively depending on the number of pulses counted so that the remaining amount of energy of the battery is made recognizable.

2. A battery checking circuit according to claim 1, wherein said accessory circuit is a strobe circuit.

3. A battery checking circuit for a camera comprising:
   (a) a first pulse generating circuit for producing a number of pulses for each operation of the camera;
   (b) a strobe circuit;
   (c) a second pulse generating circuit for producing a number of pulses corresponding to the time it takes for said strobe circuit to be fully charged;
   (d) a counter for counting and providing an output of the sum of the pulses produced from said first and said second pulse generating circuits;
   (e) display means for displaying the remaining amount of energy of a battery, said display means having a plurality of display areas arranged side by side; and
   (f) control means for controlling the operation of a plurality of display elements for said areas in accordance with the output of said counter, said control means causing said plurality of display areas to change their appearance from one side to another successively depending on the number of pulses counted so that the remaining amount of energy of the battery is made recognizable.

4. A battery checking apparatus for a camera comprising:
   (a) counter means for counting a number of operations of the camera, and
   (b) display means for schematically displaying a remaining amount of energy of the battery in a step-wise manner in response to an output of the counter means.

5. A battery checking apparatus according to claim 4, wherein said display means includes a displaying portion in the form of a battery cell.

6. A battery checking apparatus according to claim 4, wherein said counter means includes detection means for counting the number of operations of the camera by detecting frame-by-frame transfers of a light sensitive material.

7. A battery checking apparatus according to claim 4, wherein said counter means includes detection means for counting the number of the operations of the camera by detecting completions of an exposure operation.

8. A battery checking apparatus according to claim 4, wherein said display means includes warning means for warning of the consumption of the energy of the battery, said warning means changing the warning depending on temperatures.

9. A battery checking apparatus according to claim 4, wherein said display means includes variable means for varying the speed of changes in the step-wise display with respect to the counted numbers of the counter means.

10. A battery checking apparatus comprising:
    (a) counter means for counting a number of operations of an operation device.
    (b) display means for schematically displaying a remaining amount of energy of the battery in a step-wise manner in response to an output of the counter means.

11. A battery checking circuit according to claim 10, wherein said display means includes a displaying portion in the form of a battery cell.

12. A battery checking circuit according to claim 10, wherein said display means includes warning means for warning of the consumption of the energy of the battery, said warning means changing the warning depending on temperatures.

13. A battery checking circuit according to claim 10, wherein said display means includes variable means for varying the speed of changes in the step-wise display with respect to the counted numbers of the counter means.

14. A battery checking circuit for a camera comprising:
    (a) a pulse generating circuit for producing a number of pulses for each cycle of camera operation, said pulse generating circuit including a switch responsive to a winding operation;
    (b) a counter for counting and providing an output of the pulses produced from said pulse generating circuit;
    (c) display means for displaying the remaining amount of energy of a battery, and display means having a plurality of display elements defining display areas arranged side by side; and
    (d) control means for controlling the operation of the plurality of display elements for said areas in accordance with the output of said counter, said control means causing said plurality of display areas to change their appearance from one side to another successively depending on the number of pulses counted so that the remaining amount of energy of the battery is made recognizable.

15. A battery checking circuit for a camera comprising:
    (a) a pulse generating circuit for producing a number of pulse for each cycle of camera operation, said pulse generating circuit including a shutter control circuit, a signal representing termination of a shutter operation being used as a pulse for each camera operation;
    (b) a counter for counting and providing an output of the pulses produced from said pulse generating circuit;
    (c) display means for displaying the remaining amount of energy of a battery, and display means having a plurality of display elements defining display areas arranged side by side; and (d) control means for controlling the operation of the plurality of display elements for said areas in accordance with the output of said counter, said control means causing said plurality of display areas to change their appearance from one side to another successively depending on the number of pulses counted so that the remaining amount of energy of the battery is made recognizable.

16. A battery checking circuit comprising:

(a) a pulse generating circuit for producing a number of pulses for each operation of a portable instrument;

(b) a counter for counting and providing an output of the pulses produced from said pulse generating circuit;

(c) display means for displaying the remaining amount of energy of a battery, said display means having a plurality of display areas arranged side by side, a display frame surrounding the plurality of display areas, and an element whose color changes as the temperature changes in a portion of said display frame, whereby a warning region is made to shift depending on the temperature; and (d) control means for controlling the operation of a plurality of display elements for said areas in accordance with the output of said counter, said control means causing said plurality of display areas to change their appearance from one side to another successively depending on the number of pulses counted so that the remaining amount of energy of the battery is made recognizable.

17. A battery checking apparatus for a camera, comprising:

(a) first signal generating means for generating a signal in response to operation of a first operation device;

(b) second signal generating means for generating a signal in response to operation of a second operation device;

(c) counter means for counting the output of said first signal generating means and the output of said second signal generating means; and (d) display means for schematically and stepwisely displaying the amount of remaining energy in the battery in response to the output of said counter means.

18. A battery checking apparatus according to claim 17, wherein said display means includes a displaying portion in the form of a battery cell.

19. A battery checking apparatus according to claim 17, wherein said first operation device includes an exposure device.

20. A battery checking apparatus according to claim 19, wherein said second operation device includes a flashing device.

21. A battery checking apparatus according to claim 17, wherein said first signal generating means includes a detection means for detecting a frame-by-frame transfer of a light sensitive material.

22. A battery checking apparatus according to claim 17, wherein said first signal generating means includes detection means for detecting completion of an exposure operation.

23. A battery checking apparatus according to claim 17, wherein said display means includes warning means for warning of the consumption of the energy of the battery, said warning means changing the warning depending on temperature.

24. A battery checking apparatus according to claim 17, wherein said display means includes variation means for changing the speed at which the step-wise display changes with respect to the output of the counter.

25. A battery checking apparatus for a camera, comprising:

(a) counter means for counting a number of operations of an operation device;

(b) display means for displaying an amount of remaining energy in the battery in response to an output of the counter means;

(c) timer means for counting a period of time of operation of the operation device; and (d) compensation means for deeming that the operation device has not operated if the operation of the operation device is completed before the timer means counts a predetermined period of time, and for preventing this operation of the operation device from being counted by the counter means.

26. A battery checking apparatus according to claim 25, wherein said display means includes means for schematically displaying the amount of remaining energy in the battery.

27. A battery checking apparatus according to claim 26, wherein said schematically displaying means includes a display portion in a form of a battery cell.

28. A battery checking apparatus according to claim 25, wherein said display means includes warning means for warning of the consumption of the energy of the battery, said warning means changing the warning depending on temperature.

29. A battery checking apparatus for a camera comprising:

(a) signal generating means for generating a signal in response to operation of a first operation device;

(b) timer means for counting a period of time of operation of a second operation device;

(c) counter means for counting an output of said signal generating means and an output of said timer means; and (d) display means for schematically and step-wisely displaying an amount of remaining energy in the battery in response to an output of said counter means.

30. A battery checking apparatus according to claim 29, wherein said first operation device includes an exposure device.

31. A battery checking apparatus according to claim 30, wherein said second operation device includes a flashing device.

32. A battery checking apparatus according to claim 29, wherein said first signal generating means includes detection means for detecting completion of an exposure operation.

33. A battery checking apparatus according to claim 29, wherein said signal operating means includes detecting means for detecting completion of an exposure operation.

34. A battery checking apparatus according to claim 29, wherein said display means includes warning means for warning of the consumption of the energy of the battery, said warning means changing the warning depending on temperature.

35. A battery checking apparatus according to claim 29, wherein said display means includes a displaying portion in the form of a battery cell.

36. A battery checking apparatus for a camera, comprising:

(a) timer means for counting a period of time of operation of an operation device;

(b) counter means for counting the counted time of said timer means; and (c) display means for schematically and step-wisely displaying an amount of remaining energy in the battery in response to an output of said counter means.

37. A battery apparatus according to claim 36, wherein said display means includes a displaying portion in the form of a battery cell.

38. A battery checking apparatus according to claim 36, wherein said display means includes warning means for warning of the consumption of the energy of the battery, said warning means changing the warning depending on temperature.

* * * * *